US010237739B2

(12) United States Patent
Michalski et al.

(10) Patent No.: US 10,237,739 B2
(45) Date of Patent: Mar. 19, 2019

(54) SYSTEMS AND METHODS FOR TRANSMITTING CONDITIONAL ACCESS INFORMATION

(71) Applicant: Sirius XM Radio Inc., New York, NY (US)

(72) Inventors: Richard Andrew Michalski, Coral Springs, FL (US); Mark Rindsberg, Boca Raton, FL (US); Ashok Vadekar, Rockwood (CA); Paul Marko, Pembroke Pines, FL (US); Craig Wadin, Sunrise, FL (US)

(73) Assignee: Sirius XM Radio Inc., New York, NY (US)

( * ) Notice: Subject to any disclaimer, the term of this patent is extended or adjusted under 35 U.S.C. 154(b) by 72 days.

(21) Appl. No.: 15/013,006

(22) Filed: Feb. 2, 2016

(65) Prior Publication Data

US 2016/0234690 A1 Aug. 11, 2016

Related U.S. Application Data

(63) Continuation-in-part of application No. PCT/US2014/049650, filed on Aug. 4, 2014, which is (Continued)

(51) Int. Cl.
*H04W 12/06* (2009.01)
*H04L 9/32* (2006.01)
(Continued)

(52) U.S. Cl.
CPC .......... *H04W 12/08* (2013.01); *H04L 9/3242* (2013.01); *H04W 4/06* (2013.01); *H04W 4/12* (2013.01); *H04W 12/06* (2013.01); *H04W 48/10* (2013.01)

(58) Field of Classification Search
CPC ......... H04W 4/06; H04W 4/12; H04W 12/06; H04W 12/08; H04W 48/10; H04L 9/3242
See application file for complete search history.

(56) References Cited

U.S. PATENT DOCUMENTS

2002/0021465 A1* 2/2002 Moore, Jr. .......... H04L 12/2803
398/72
2002/0101991 A1* 8/2002 Bacon ................ H04N 21/4181
380/212
(Continued)

FOREIGN PATENT DOCUMENTS

WO 2015017867 A1 2/2015

OTHER PUBLICATIONS

International Search Report Application No. PCT/US2014/049650, International Filing Date Aug. 4, 2014, dated Nov. 20, 2014.

*Primary Examiner* — Yonas A Bayou
(74) *Attorney, Agent, or Firm* — Kramer Levin Naftalis & Frankel LLP

(57) ABSTRACT

Various multiple methods of data transport, and combinations thereof, may be used to initialize or update conditional access information on various devices. In an integrated device having both a broadcast receiver, such as an SDARS receiver, and a two-way communications transceiver, such as an LTE, 3G, 4G or 5G modem, or the like, conditional access information for the broadcast receiver may be sent to the transceiver, and then passed to the broadcast receiver, or vice versa. Additionally, for example, the broadcast receiver may be sent, over the broadcast communications channel, a "wake-up" message for the two-way transceiver, which message may then be passed to the two-way transceiver, so as to make it ready to receive conditional access information over the two-way communications channel, or vice versa. Moreover, because of the presence of a two-way communications path, various acknowledgements of conditional (Continued)

access status updates received and processed by the broadcast receiver may be sent—thus realizing a significant improvement over the current practice of sending multiple periodic messages over the broadcast channel, to insure (but never have confirmation of) receipt.

20 Claims, 9 Drawing Sheets

Related U.S. Application Data a continuation-in-part of application No. PCT/US2015/018792, filed on Mar. 4, 2015.

(60) Provisional application No. 61/861,678, filed on Aug. 2, 2013, provisional application No. 61/947,955, filed on Mar. 4, 2014.

(51) Int. Cl.
*H04W 48/10* (2009.01)
*H04W 12/08* (2009.01)
*H04W 4/06* (2009.01)
*H04W 4/12* (2009.01)

(56) References Cited

U.S. PATENT DOCUMENTS

| | | | |
|---|---|---|---|
| 2003/0066075 A1* | 4/2003 | Bahn | H04N 5/44543 725/25 |
| 2004/0088537 A1* | 5/2004 | Swander | H04L 63/0464 713/153 |
| 2005/0047448 A1 | 3/2005 | Lee et al. | |
| 2006/0041891 A1* | 2/2006 | Aaron | G09B 7/00 719/315 |
| 2006/0156416 A1* | 7/2006 | Huotari | H04L 63/08 726/27 |
| 2006/0294250 A1* | 12/2006 | Stone | H04L 63/10 709/229 |
| 2007/0033419 A1* | 2/2007 | Kocher | G06F 21/10 713/193 |
| 2008/0112405 A1* | 5/2008 | Cholas | H04L 63/062 370/389 |
| 2008/0134309 A1* | 6/2008 | Qin | G06F 21/105 726/6 |
| 2008/0313691 A1* | 12/2008 | Cholas | H04N 21/4147 725/131 |
| 2010/0080163 A1 | 1/2010 | Krishnamoorthi et al. | |
| 2011/0239287 A1* | 9/2011 | Pak | G06Q 30/06 726/10 |
| 2011/0302624 A1* | 12/2011 | Chen | G06Q 20/10 726/1 |

\* cited by examiner

SYSTEMS AND METHODS FOR TRANSMITTING CONDITIONAL ACCESS INFORMATION

CROSS-REFERENCE TO RELATED APPLICATIONS

The present application is a continuation-in-part of international application PCT/US2014/049650, filed on Aug. 4, 2014, which published as WO 2015/017867, which itself claims priority to U.S. Provisional Patent Applications (i) No. 61/861,678, filed on Aug. 2, 2013, entitled "HYBRID TRANSPORT CONDITIONAL ACCESS METHODS AND SYSTEMS," and (ii) 61/947,955, entitled "SATELLITE PROVISIONING OF CELL SERVICE," filed on Mar. 4, 2014, the entire disclosure of each of which is hereby incorporated herein by this reference. This application also claims priority to continuation-in-part of international application PCT/US2015/018792, filed on Mar. 4, 2015, which published as WO 2015/134644, entitled "SATELLITE PROVISIONING OF CELL SERVICE," which itself claims priority to U.S. Provisional Patent Application No. 61/947,955, entitled "SATELLITE PROVISIONING OF CELL SERVICE," filed on Mar. 4, 2014, the entire disclosure of which is hereby incorporated herein by this reference.

TECHNICAL FIELD

The present invention is generally directed to subscriber based broadcast and communication systems, and in particular to various systems and methods for transmitting conditional access information to various subscribers or authorized users, and their various devices or combinations of devices, so that they can access the subscribed to content.

BACKGROUND OF THE INVENTION

Conventionally, there are a few methods of effecting conditional access for a system with devices to be activated and/or authorized in the field. Broadcast systems, such as, for example, Satellite Digital Audio Radio Services ("SDARS"), transmit conditional access information in a 1-way manner and use multiple repeat methodologies to ensure receipt of such information by the devices. Point-to-point systems, such as, for example, telematics systems, generally transmit conditional access information in a 2-way manner and use acknowledgement methodologies to ensure receipt of such information by the intended devices.

SUMMARY OF THE INVENTION

Various multiple methods of data transport, and combinations thereof, may be used to initialize or update conditional access information on various devices. In an integrated device having both a broadcast receiver, such as an SDARS receiver, and a two-way communications transceiver, such as an LTE, 3G, 4G or 5G modem, or the like, conditional access information for the broadcast receiver may be sent to the transceiver, and then passed to the broadcast receiver, or vice versa. Additionally, for example, the broadcast receiver may be sent, over the broadcast communications channel, a "wake-up" message for the two-way transceiver, which message may then be passed to the two-way transceiver, so as to make it ready to receive conditional access information over the two-way communications channel, or vice versa. Moreover, because of the presence of a two-way communications path, various acknowledgements of conditional access status updates received and processed by the broadcast receiver may be sent—thus realizing a significant improvement over the current practice of sending multiple periodic messages over the broadcast channel, to insure (but never have confirmation of) receipt.

BRIEF DESCRIPTION OF THE DRAWINGS

The present invention will be more readily understood with reference to various exemplary embodiments thereof, as shown in the drawing figures, in which.

DETAILED DESCRIPTION OF THE INVENTION conditional access information is needed to access protected communications channels, such as, for example, subscription service satellite radio or television, or, for example, cellular phone and data access via a wireless communications network or the like. In general, a user device needs to receive conditional access information in order to receive and decode the subscribed to service, or to access the communications network. In one approach, this information can be sent initially, and then the device has and retains access until a follow-up message removing the access is sent.

Previous systems and methods for transmitting conditional access information to devices receiving satellite broadcast services generally relied solely on a broadcast transmission path to send the conditional access information. They tended to rely on a "controller" to make a determination as to whether or not it was connected to the subscription receiver, and then also relied on the same controller to request a deactivation to remove service (i.e., the ability to receive and decode it) from the subscription receiver.

Figure 7:
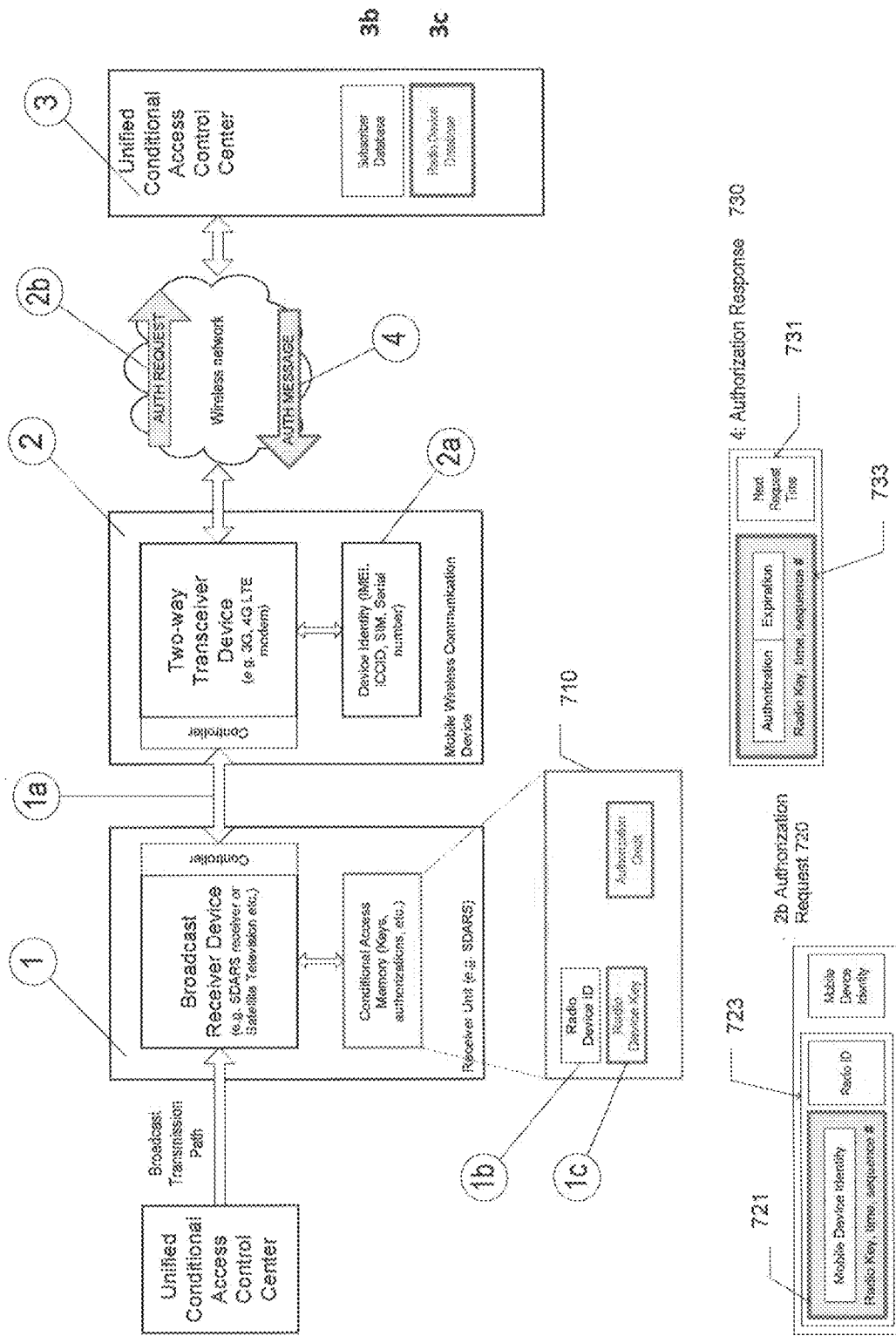
FIG. 7 illustrates updating 1-way conditional access information using a 2-way path of a tethered or integrated 2-way transceiver device according to an exemplary embodiment of the present invention.

In contrast, in exemplary embodiments of the present invention, a subscription receiver may, for example, require a periodic or quasi-periodic sequence of conditional access updates at either a substantially fixed, or some configurable, frequency in order to maintain its activation state. This is an inherently more secure method of ensuring that, for example, a radio authorized using this method will only remain authorized for an extremely limited time. In one implementation, using a tethered smart phone to a satellite radio receiver (as shown in FIG. 7) a "next request time" may be explicitly sent at the time the authorization is provided, along with an expiration time of the initial authorization. In a scheme such as this, the expiration time could be a short period such as, for example, 10 to 15 minutes and the next request time could be something somewhat less than the expiration time such as, for example, 5 minutes. Thus, the initial authorization would last only for that short period, unless a series of subsequent authorization requests were sent and granted. For example, an initial authorization can be for 15 minutes. Moreover, a request for authorization can be sent every 5 minutes and each granted request for authorization can, for example, push the expiration time 15 minutes past the last granting time. In this way network delays or brief outages will not terminate the broadcast authorization, but once the devices are no longer paired, the broadcast subscription will quickly time out. The time-limited authorization eliminates the need for a Two-Way Transceiver Device to send a deactivation request. In general, the expiration time maybe a number of minutes N, and authorization requests can be sent every M minutes, where M<N. M may be, in various implementations, N/4, N/3, N/2, 2N/3, or any other, as desired, length of time less than N, with a reasonable cushion of time interval between M and N (so as to avoid unintended deactivations due to network, communications, or processing delays).

In what follows, the term "1-way" refers to a communications channel, where communications are sent from a source to one or more receivers, but the receivers cannot communicate back to the source, such as in a radio service broadcasting to various receivers. Similarly, the term "2-way" refers to a communications channel, such as a point to point system, where a first point can transmit to a second, and in turn the second point can transmit back to the first point, such as, for example, in cellular communications, satellite telephones, wired and wireless communications networks, vehicular communications over cellular and wireless networks, etc.

Various methods exist for effecting conditional access for a system with devices to be activated and/or authorized in the field. For example, broadcast systems, such as, for example, satellite radio services, transmit conditional access information in a 1-way manner and use multiple repeat methodologies to ensure receipt of such information by the devices. Point-to-point systems, such as, for example, Telematics, transmit conditional access information in a 2-way manner and use acknowledgement methodologies to ensure receipt of such information by the devices. Combining these modalities in a single device or in a pair of linked or tethered devices, whether linked or paired for a short time, such as via a docking device, or long term, such as by being provided in an integrated device (e.g., in a vehicle infotainment system) provides enhanced functionality.

Figure 8:
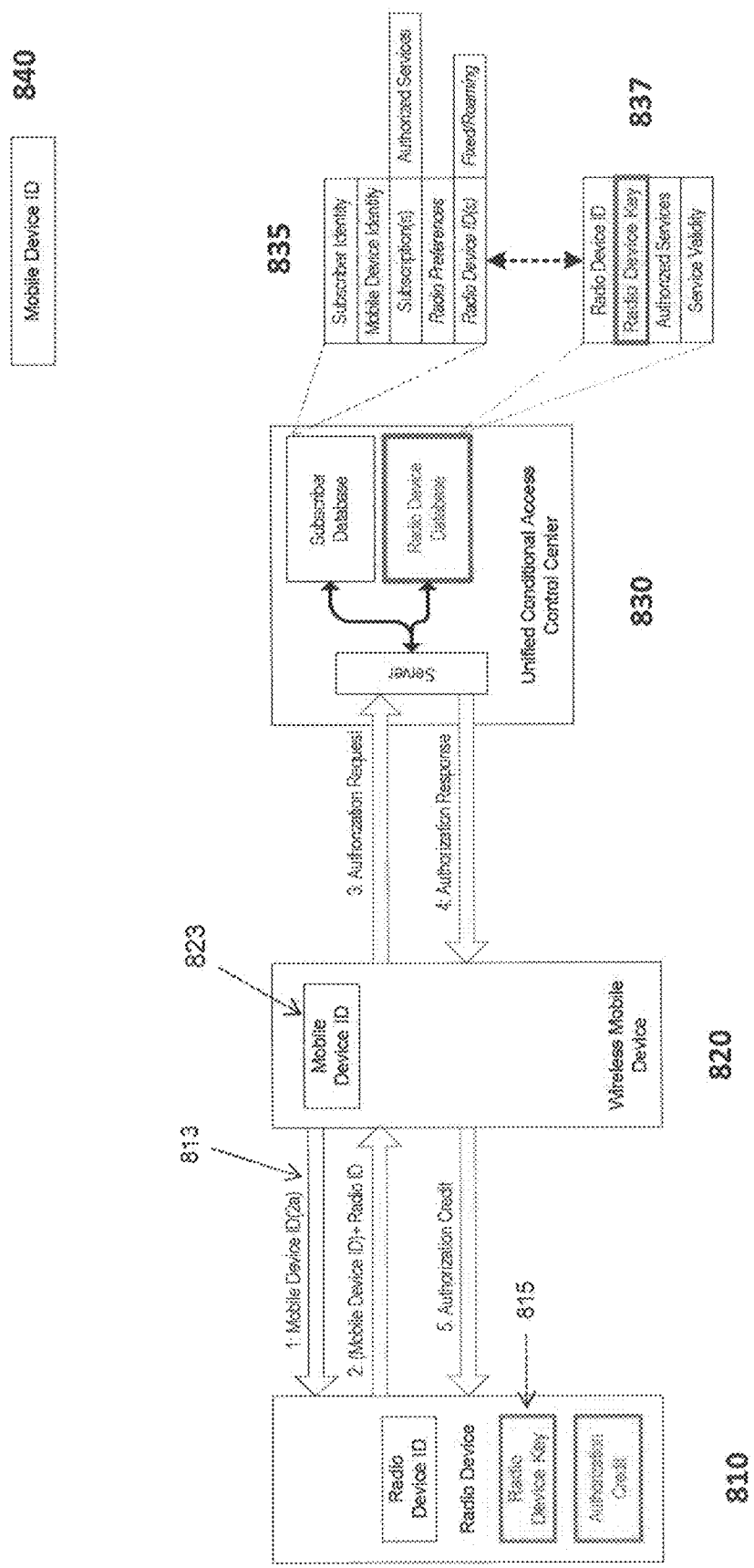
FIG. 8 depicts further details of the various processes depicted in FIG. 7.

In what follows, various exemplary implementations to send and acknowledge conditional access messages are described, for both a "single device" scenario as well as a "dual device" scenario. In particular, FIGS. 1-6 illustrate examples for a single integrated device, such as may be used in an integrated telematics and SDARS unit (sometimes known as a Connected Services Unit, or "CSU") containing both a 1-way receive path, and at least one 2-way transmit/receive path. Similarly, FIGS. 7-8 illustrate an example for two devices that are temporarily tethered or connected, such as may be used in a smartphone tethered to a head unit containing an SDARS receiver, for example.

Single Device Concept

In exemplary embodiments of the present invention, a single device system can, for example, include at least one 1-way receive path, and at least one 2-way transmit/receive path, a controller connected to all receive-only paths and all transmit/receive paths, and a non-volatile memory to store received conditional access information. In addition, such a system can interact with a conditional access control center that transmits using one or more transmit paths, and receives using one or more receive paths, the relevant conditional access information to a plurality of devices in the field. In various exemplary embodiments of the present invention, conditional access information can be transmitted using one or more paths, and one or more acknowledgements, if any, can be received using one or more paths. Various permutations of such a process are possible, and thus FIGS. 1-6, next described, illustrate six exemplary scenarios for updating conditional access information.

As noted, a single device system as shown in FIGS. 1-6 can be a "Combined Services Unit" or "CSU", for use in vehicles. The CSU can integrate SDARS or other broadcast content service receiver functionality with an LTE, 3G, 4G or even 5G modem, and thereby implement telematics type functionality.

In all of these single device scenarios, as well as any dual device scenario described below, the initial request from a potential subscriber for radio authorization (what may be termed "Step 0") is not shown. It is noted that such a request to the conditional access control center may be accomplished via a phone call to a listener care center (where the order could be processed by an automated voice response system, or, for example, by a human listener care agent), by accessing a web portal using any device capable of accessing the Internet, or by some user interface connected directly to the single combined device itself.

Figure 1:
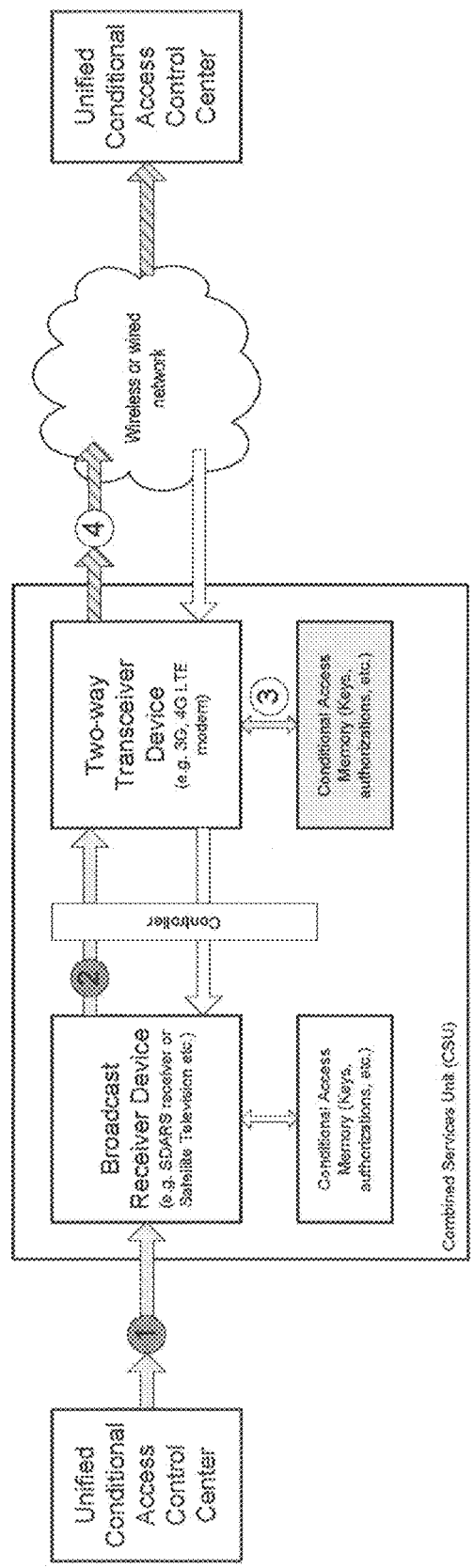
FIG. 1 illustrates updating 2-way conditional access information using a broadcast 1-way path with an acknowledgement sent using the transmit path of the 2-way portion of the device according to an exemplary embodiment of the present invention.

FIG. 1 illustrates updating 2-way conditional access information (i.e., the ability of a 2-way device to receive and decrypt content) using a broadcast 1-way path with an acknowledgement (either completion or partial) that is sent using the transmit path of the 2-way portion of the device. With reference thereto, at (index number) 1, a Unified Conditional Access Control Center sends conditional access information to the Broadcast Receiver Device, as shown. At 2, the Broadcast Receiver Device sends the conditional access information to the Two-Way Transceiver Device. The Two-Way Transceiver Device uses the conditional access information received from the Broadcast Receiver Device to interact with its conditional access memory and update its conditional access information. The interaction with the conditional access memory is shown at 3 in the figure. Next, the two-way device sends an acknowledgement message, over a wireless or a wired network, for example, back to the Unified Conditional Access Control Center over the two-way communications path. As noted, the acknowledgement can be a simple acknowledgement of the conditional access state change, or optionally, can include a hash of the conditional access state, including other useful information. For example, the acknowledgement may contain a hash or permutation of the final conditional access state of the device, the hash including a cumulative result of all messages received along with at least one other event. Or, for example, the acknowledgement may include a hash or permutation of the final conditional access state of the device, the hash including a cumulative result of all messages received along with at least one of listening time and user actions. It is noted that by using a hash of the conditional access state change, or a hash of the complete conditional access state of the device, it is possible to confirm that (i) not only were the conditional access messages received by the device, but that (ii) they were also processed and acted upon to effect a desired change in conditional access state of the device, and thus that (iii) the device is now in the desired end-state, able to decrypt content in accordance with its account status. Thus, no additional conditional access messages would then be required to be sent to the device.

Thus, in the example scenario of FIG. 1, the two-way device is authorized over the broadcast transmission path with optional acknowledgment over the two-way path.

Figure 2:
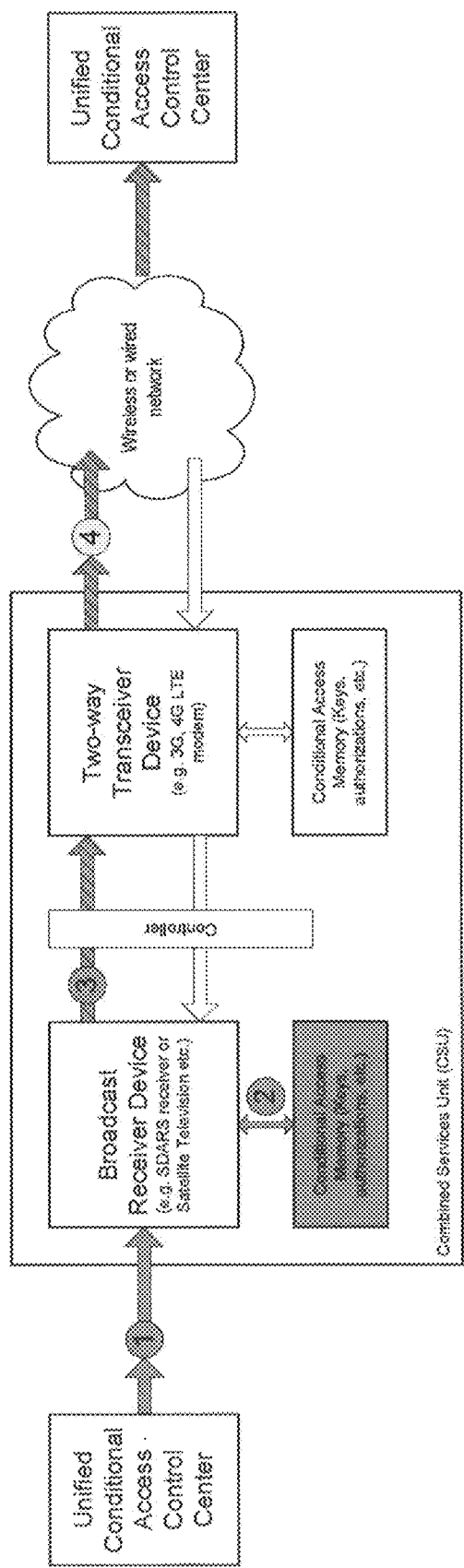
FIG. 2 illustrates updating 1-way conditional access information using a broadcast 1-way path an acknowledgement sent using the transmit path of the 2-way portion of the device according to an exemplary embodiment of the present invention.

A similar communications process can be used to update the conditional access information for the one-way, or Broadcast Receiver Device (e.g., an in vehicle SDARS radio or the like) as shown in FIG. 2. FIG. 2 illustrates updating 1-way conditional access information using a broadcast 1-way path, and an acknowledgement of the update (either completion or partial) sent using the transmit path of the 2-way portion of the device. With reference to FIG. 2, the Unified Conditional Access Control Center sends conditional access information at (index number) 1 to the Broadcast Receiver Device. The Broadcast Receiver Device uses the conditional access information to interact with its conditional access memory, as shown at 2, and then, when the information is updated or processed, the Broadcast Receiver Device communicates an acknowledgement at 3 through the controller to the two-way transceiver device. The Two-Way Transceiver Device then sends this acknowledgement, at 4, over the wireless or wired network back to the Unified Conditional Access Control Center. As in the case of the example scenario of FIG. 1, the acknowledgement can be a simple acknowledgement of the conditional access state change, or optionally, can include a hash of the conditional access state, including other useful information, as described above. Thus, in this scenario, the broadcast device is authorized over the broadcast transmission path and an acknowledgement is sent over the two-way path.

Figure 3:
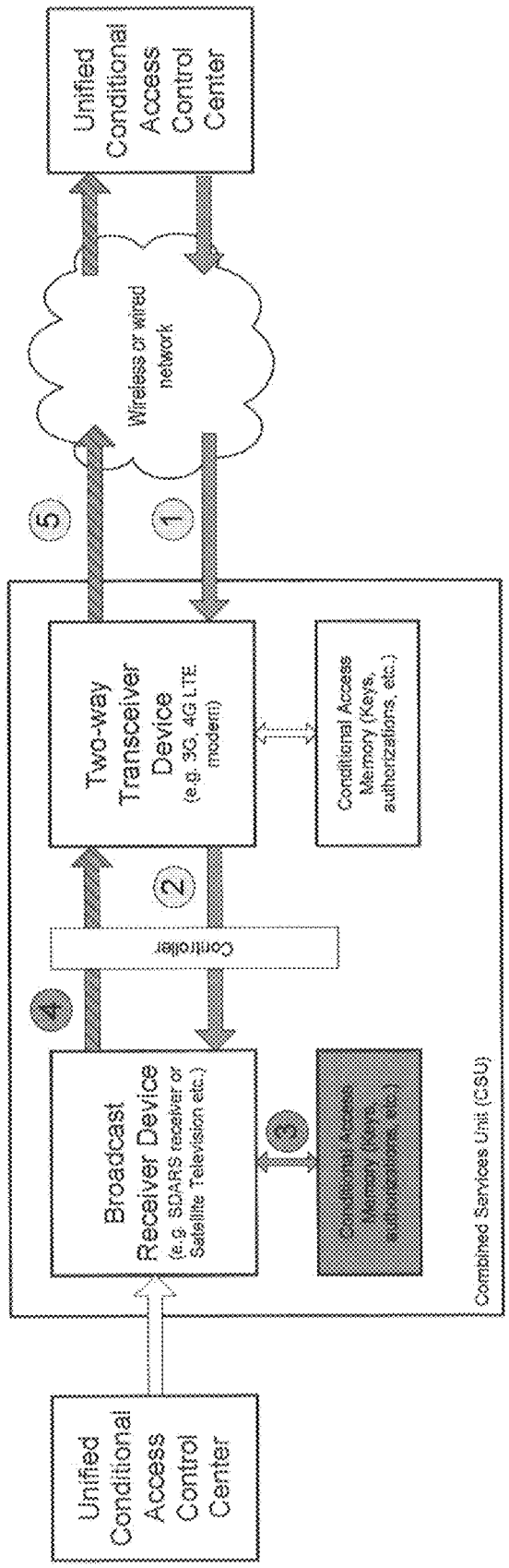
FIG. 3 illustrates updating 1-way conditional access information using a 2-way path with an acknowledgement sent using the transmit path of the 2-way portion of the device according to an exemplary embodiment of the present invention.

FIG. 3 illustrates updating the 1-way conditional access information using a 2-way path with an acknowledgement (either completion or partial) sent using the transmit path of the 2-way portion of the device. Here the Unified Conditional Access Control Center first sends conditional access information over the wireless or wired network at the right side of FIG. 3, at (index number) 1, to the Two-Way Transceiver Device. The Two-Way Transceiver Device, at 2, communicates the conditional access information to the one-way device, namely, the Broadcast Receiver Device. In similar fashion to that described above in connection with FIG. 2, the Broadcast Receiver Device at 3 then accesses the conditional access memory to update its conditional access information. It then sends an acknowledgement at 4 across the controller to the Two-Way Transceiver Device which then at five returns the acknowledgement information through the wireless or wired network to the Unified Conditional Access Control Center. As in the case of the example scenarios of FIGS. 1 and 2, the acknowledgement can be a simple acknowledgement of the conditional access state change, or optionally, can include a hash of the conditional access state, including other useful information, as described above.

Thus, in the example scenario of FIG. 3, a broadcast device is authorized over the two-way path with optional acknowledgment over the two-way path.

Figure 4:
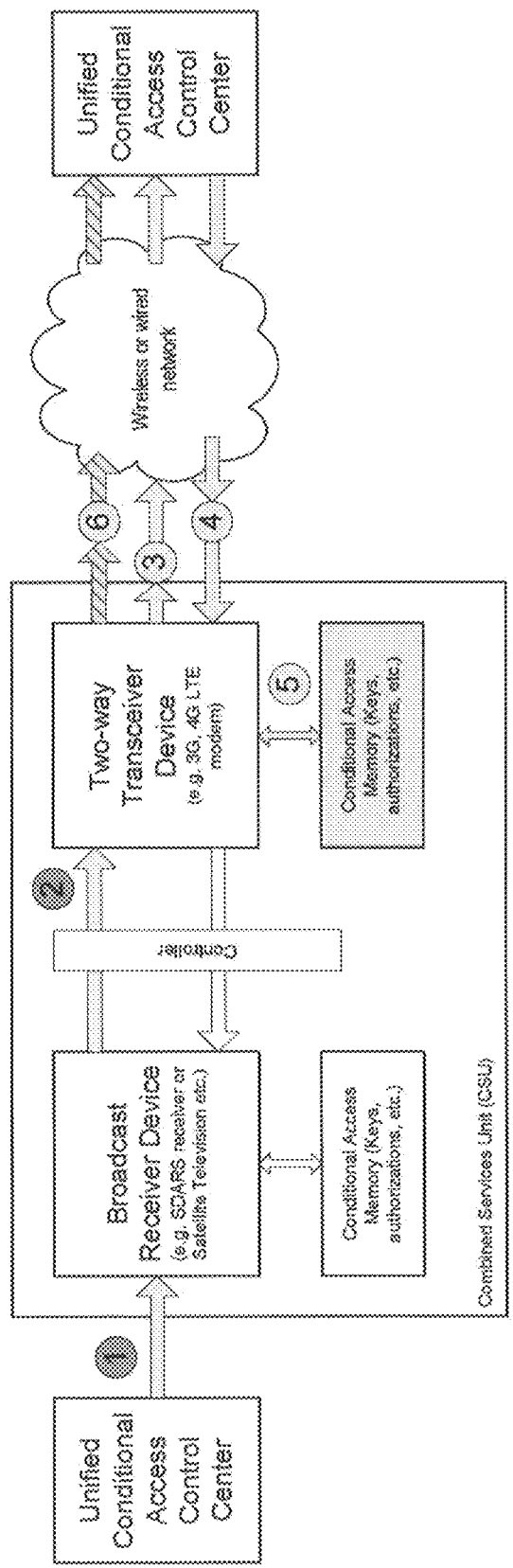
FIG. 4 illustrates updating 2-way conditional access information using a broadcast 1-way path to wake up a 2-way portion of the device to prepare to receive the conditional access information using the 2-way path with an acknowledgement sent using the transmit path of the 2-way portion of the device according to an exemplary embodiment of the present invention.
Figure 5:
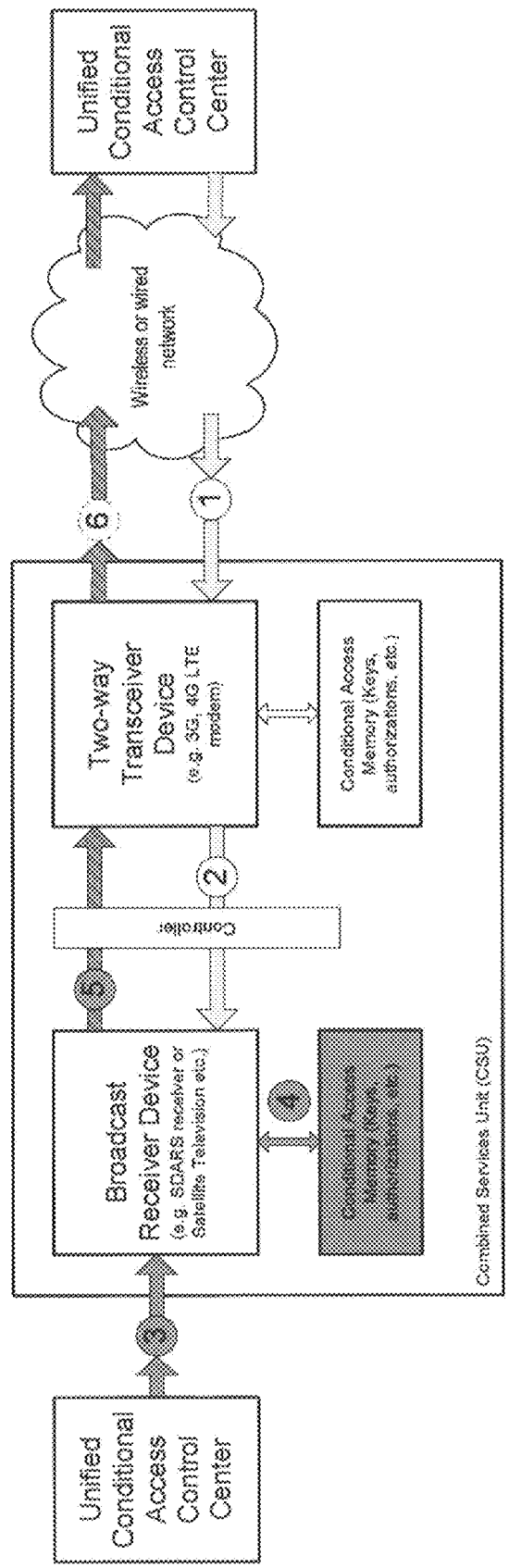
FIG. 5 illustrates updating 1-way conditional access information using a 2-way path to wake up a 1-way portion of the device to prepare to receive the conditional access information using the 1-way path with an acknowledgement sent using the transmit path of the 2-way portion of the device according to an exemplary embodiment of the present invention.
Figure 6:
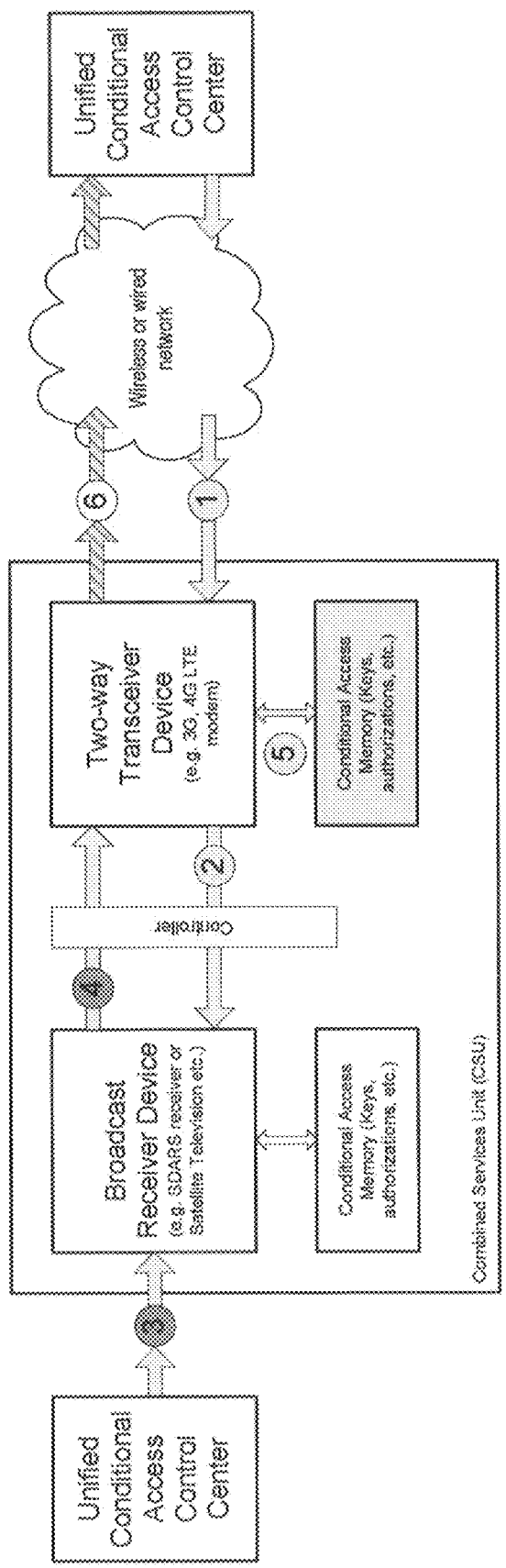
FIG. 6 illustrates updating 2-way conditional access information using a 2-way path to wake up a 1-way portion of the device to prepare to receive the conditional access information using the 1-way path with an acknowledgement sent using the transmit path of the 2-way portion of the device according to an exemplary embodiment of the present invention.

FIGS. 4-6 add a bit of complexity to the examples of FIGS. 1-3, namely, where one device is used to wake up another device to then receive conditional access information. These scenarios are next described.

FIG. 4 illustrates updating 2-way conditional access information (on the two-way portion of the device) using a broadcast 1-way path to wake up a 2-way portion of the device to request the conditional access information using the 2-way path with an acknowledgement (either completion or partial) to be sent using the transmit path of the 2-way portion of the device. With reference thereto, at 1, the Uniform Conditional Access Control Center sends a "wake-up" message over the broadcast channel, or the one-way path, to the Broadcast Receiver Device. The Broadcast Receiver Device passes along, at 2, the wake-up message to the Two-Way Transceiver Device. The Two-Way Transceiver Device, then, having received the wake-up message, at 3, sends a request to the Unified Conditional Access Control Center over the wireless or wired network for the conditional access information. The Unified Conditional Access Control Center sends the conditional access information, at 4, over the same, or over another, wireless or wired network, to the Two-Way Transceiver Device which then accesses the Two-Way Transceiver Device's conditional access memory at 5 thereby updating its conditional access information. When the conditional access information has been updated, an acknowledgement message is sent at 6 from the Two-Way Transceiver Device over the wireless or wired network to the Unified conditional access Control Center. As in the case of the example scenarios of FIGS. 1-3, the acknowledgement can be a simple acknowledgement of the conditional access state change, or optionally, can include a hash of the conditional access state, including other useful information, as described above. This is also true of the acknowledgements sent in the exemplary scenarios of FIGS. 5 and 6, and will not be repeated in the description of those scenarios.

Thus, in the example scenario of FIG. 4, a broadcast device wakes up or turns on the two-way device. The two-way device sends a message to the Unified Conditional Access Control Center which sends the conditional access information over the two-way path, and finally the unit sends an acknowledgement over the two-way path.

It is noted that the scenario of FIG. 4 is useful when the Broadcast Receiver Device is continually on—but for reasons of saving energy or saving power—the Two-Way Transceiver Device, which may be, for example, imbedded in an exemplary Combined Services Unit (CSU), as shown in FIG. 4, is not always on and is often in a sleep state. In such a sleep state, therefore, it cannot receive its own conditional access update information unless it is first woken up; that is the function of sending the wake-up message, at 1, to the Broadcast Receiver Device, which then passes the wake-up message, at 2, to the Two-Way Transceiver Device. Once the Two-Way Transceiver Device has been awakened, it can proceed to request the conditional access update, at 3, as described above.

FIG. 5, in similar fashion to FIG. 4, illustrates updating 1-way conditional access information using a 2-way path to wake up a 1-way portion of the integrated device to prepare to receive the conditional access information using the 1-way path with an acknowledgement (either completion or partial) sent using the transmit path of the 2-way portion of the device. This is essentially the inverse of the situation illustrated in FIG. 4. With reference to FIG. 5, the Unified Conditional Access Control Center, shown at the right side of the figure, sends a wake-up message at one over the wireless or wired network to the Two-Way Transceiver Device embedded in the CSU. (It is noted that the Unified Conditional Access Control Center is simply shown on both the far right and the far left sides of the figure for convenience, and that it can be, and often is, the same Unified Conditional Access Control Center). The Two-Way Transceiver Device passes this wake-up message at 2, through the controller, to the Broadcast Receiver Device. The Broadcast Receiver Device, then, now having been awakened, can receive the conditional access information from the Unified Conditional Access Control Center, at 3. It is noted that, unlike the situation of the Two-Way Transceiver Device of FIG. 4, the Broadcast Receiver Device in FIG. 5, once awakened, cannot itself request its conditional access update from the Unified Conditional Access Control Center, as it is only a one-way receiver. Rather, once the wake up is sent, a defined time period can be waited, and following the lapse of such a time period, where it can be safely assumed that the Broadcast Receiver Device has now been awakened, the Unified Conditional Access Control Center can begin sending conditional access updates, or information messages, over the broadcast channel, at 3. Having received the conditional access information at 3, the Broadcast Receiver Device can now interact with the conditional access memory, at 4, to update its conditional access state. Having completed the update, it can pass an acknowledgement message, at 5, through the controller to the Two-Way Transceiver Device embedded in the CSU. Upon receipt of the passed acknowledgement, the Two-Way Transceiver Device, at 6, can send the acknowledgement over the wireless or wired network back to the Unified Conditional Access Control Center which can then verify that the Broadcast Receiver Device has received the broadcast conditional access information which was sent at 3.

Thus, in the example scenario of FIG. 5, a two-way device wakes up or turns on a broadcast device so that the broadcast device can receive authorization over the broadcast path, followed by an acknowledgement over the two-way path.

Finally, FIG. 6 illustrates updating the two-way transceiver's conditional access information using (i) the two-way path to (ii) wake up the one-way portion of the CSU to prepare to receive conditional access information using the one-way path, with an acknowledgement (either completion of update or partial) being sent using the transmit path of the two-way portion of the device. This is essentially the same process as shown in FIG. 5, except that the conditional access information sent to the Broadcast Receiver Device is not used by it itself, but rather, is simply passed by the Broadcast Receiver Device, through the controller, to the Two-Way Transceiver Device. The reason why one would do this is if, for example, the conditional access information update is large and it would cost some not insignificant amount to send it over the wireless or wired network—where data is charged for by usage—and therefore it being cheaper or more economical to send it over the broadcast channel which is, essentially, once in place, free. (This is because subscription service receivers charge a fixed fee for receipt of a set of channels, but do not meter how much content data is received—it is a one-way device, after all).

Continuing with reference to FIG. 6, the Unified Conditional Access Control Center initiates sending a wake-up message 1 over the wireless or wired network to the Two-Way Transceiver Device. Upon receipt of this message, at 2, the Two-Way Transceiver Device passes the wake-up message to the Broadcast Receiver Device. The Broadcast Receiver Device, after an appropriate time, can be assumed to now be awake and able to receive conditional access information. This information is then sent at 3 from the Unified Conditional Access Control Center to the Broadcast Receiver Device. Upon receipt of the conditional access information, the Broadcast Receiver Device, at 4, passes that conditional access information to the Two-Way Transceiver Device, which, at 5, interacts with its conditional access memory to update its conditional access state. Upon completion of the update, or, for example, not an update at all, but rather an initial provisioning or granting of conditional access to the two-way transceiver device, the Two-Way Transceiver Device sends an acknowledgement, at 6, over the wireless or wired network back to the Unified Conditional Access Control Center.

Thus, in the example scenario of FIG. 6, a two-way device wakes up or turns on a broadcast device so that the broadcast device can receive authorization over the broadcast path, followed by an acknowledgement over the two-way path.

It is noted that the situation of FIG. 6 also assumes that the Broadcast Receiver Device is not always on, but may be in a sleep mode and require waking up through the message 1, which is passed to it at 2, in order to receive the content of the conditional access information which is sent as a message at 3, in order that the Broadcast Receiver Device, once having received it, can pass it to the Two-Way Transceiver Device. Thus, the scenario of FIG. 6 assumes that it is (i) cost effective to send the conditional access information over the broadcast channel, namely the one-way channel, and (ii) only to send wake-up messages and acknowledgements over the wireless or wired network, and that (iii) the Broadcast Receiver Device is not always on, whereas the Two-Way Transceiver Device is always on. In general, when using one device to wake up the other in, for example, an integrated combined services unit, or, for example, in a temporarily connected context (e.g., a tethered smartphone to an SDARS head unit in a vehicle) such as is described below in connection with FIGS. 7-9, the device which is assumed to be always on is the one to which the wake-up message is initially sent (because it is unreliable to send a "wake-up" message to a sleeping device which may never get there) and that "always on" device passes the wake-up message to the other device—which is not always on. Then, once the latter device is awakened, it can receive the actual content of the lengthy conditional access message for either itself, or for the two-way transceiver device, which are the cases shown respectively in FIGS. 5 and 6.

It is here noted that in the context of a future wake-up event, an exemplary device may send an acknowledgement of the fact that a future wake-up message was received, processed and stored so that the Central Conditional Access Center may have some reasonable degree of confidence that (i) it could begin transmitting the conditional access information at that future time, and that (ii) the intended target or targets for the messages would be awake to receive the messages. Clearly, the acknowledgement can only be sent during a period of time when the one-way device itself is awake prior to the scheduled wake-up time of the one-way device to receive the conditional access information. For example, a message could be sent over the two-way path on a Monday morning indicating that a given Broadcast Receiver Device (that is not always on) should wake up on the following Wednesday at 2 AM to receive an update. On Tuesday the Broadcast Receiver Device wakes up as part of normal operation, receives the future wakeup message from the two-way device and acknowledges receipt to the two-way device. Then the two-way device may, for example, send that acknowledgement to the conditional access center, and the 2 AM transmission from the Conditional Access Center to the one-way Broadcast Receiver Device can take place as scheduled. If the one-way Broadcast Receiver Device is never powered up, and/or never acknowledges receipt of the message, then the 2 AM broadcast is delayed, or, for example, in the case that the broadcast is targeted at multiple one-way devices, some of which may have acknowledged receipt while others have not, an alternate path can be used to update those specific one-way devices, such as, for example, using a two-way path of a device connected to them, such as the exemplary two-way device shown in FIGS. 5 and 6.

Additional Acknowledgements

It is further noted that in exemplary embodiments of the present invention, various other acknowledgements may be sent, as may be useful, in any of the single unit (e.g., CSU) or double unit (e.g., tethered smartphone to Broadcast Receiver Device in vehicle head unit) scenarios described herein. The illustrative acknowledgements shown in FIGS. 1-8 are thus purely exemplary in nature, and not intended as exclusive or comprehensive.

Other examples of acknowledgements which may be useful, specifically in the case of very lengthy messages or conditional access code updates, which may be sent in pieces or as a plurality of individually identifiable messages or packets, can include, for example:
(1) acknowledgements that include a sequence number or index (or list of sequence numbers or indices), or other similar means of indicating which specific message(s) or packet(s) out of the plurality of required packets have been received by the device, so that the transmission of those specific packets or messages can be stopped; and
(2) acknowledgements that include a sum or total number or received packets or messages so that the effectiveness of the transmission can be evaluated. For example, if only 50% of the required messages have been received via the broadcast path, the transmission of those messages may need to be continued for a longer time, or alternatively, the remaining messages may need to be transmitted via the two-way transmission path.

Dual Device Concept/Scenarios

In addition to the single-device scenarios of FIGS. 1-6, there also exist scenarios for hybrid conditional access in which a stand-alone Broadcast Receiver Device (e.g., a satellite radio) is temporarily docked or tethered to one or more devices, such as, for example, a smart phone, smart pad, laptop, etc. that provides access to a two-way wireless or wired communications network. In this "temporarily connected" scenario (which is similar to the scenario of FIG. 3 for the single integrated device) the authorization for the broadcast receiver is valid only for the duration (or substantially only for the duration) that the two devices are tethered or docked. This feature is most useful, as it allows a "portable" broadcast subscription to be moved around, from device to device, by a subscriber, freeing him or her from a single vehicle, radio, or other dedicated device.

As noted above, FIGS. 7 and 8 illustrate exemplary methods for updating conditional access information in a dual device scenario. As noted, such a scenario can include, for example, a pair of devices, where at least one device includes a 1-way receive path for an encrypted broadcast communication and the other device includes at least one 2-way transceiver that enables communication with for example a wide area network, and both devices are temporarily linked or tethered together such that they can exchange information with each other, send requests for authorization to the conditional access control center, and transfer any temporary authorization from the Conditional Access Control Center enabling the broadcast receiver to receive encrypted communications over the broadcast path while the two devices are linked or tethered.

Dual Device Concept:

In exemplary embodiments of the present invention, as illustrated in FIG. 7, a dual device system may include: (1) A Satellite Radio Module or Receiver Unit that includes (1*a*) at least one method of linking or tethering to (2) a Mobile Wireless Communication Device with the ability to transfer data, at least a (1*b*) unique Radio Device ID and at least (1*c*) one secret key or other method for signing or encrypting information, and (1*d*) the ability to encrypt or otherwise authenticate (using a MAC[1], for example) a (2*a*) unique ID associated with (2) a Mobile Wireless Communication Device, having (2*a*) a unique device identity comprising IMEI, CCID, Serial number, or some combination of these factors, and the ability to send (2*b*) an Authorization Request to (3) A Unified Conditional Access Control Center, with at least (3*a*) a server (not shown in FIG. 7), and at least (3*b*) a Subscriber Database and (3*c*) a Radio Device Database, such that the server (3*a*) can look up an subscription account in the Subscriber Database based on a unique Mobile Wireless Communication Device identity, look up (1*b*) the Radio Device ID in the Radio Device Database to find the appropriate key and/or algorithm to decrypt or validate an authorization request, and generate (4) an Authentication Message containing at least (4*a*) an authorization code or key and (4*b*) an expiration date and time (4*a* and 4*b* are not shown in FIG. 7 explicitly, but are understood to be subsumed under "Authorization Message" 4 730).

[1] In cryptography, a message authentication code (MAC) is a short piece of information used to authenticate a message—in other words, to confirm that the message came from the stated sender (its authenticity) and has not been changed in transit (its integrity).

A MAC algorithm, sometimes called a keyed (cryptographic) hash function, accepts as input a secret key and an arbitrary-length message to be authenticated, and outputs a MAC (sometimes known as a tag). The MAC value protects both a message's data integrity as well as its authenticity, by allowing verifiers (who also possess the secret key) to detect any changes to the message content.

As shown at 710, the Conditional Access Memory of the Broadcast Receiver Device should preferably have at least some portion which is fixed or only programmable with great difficulty (such as One-Time Programmable memory) containing the identity of the Radio and at least one fixed key.

In a preferred exemplary implementation, the Mobile Device, or more correctly, an application running on the Mobile Device, can, for example, send the Mobile Device Identity (2*a*) to (1) the Receiver Unit (or Radio Module), which in turn can secure the unique ID by encryption or appending a message authentication code. The Mobile Device can then send an (2*b*) Authorization Request 720—an example of which is shown at the bottom left of FIG. 7, containing a Secured Mobile Device Identity 721 (with Radio Key, time and sequence number) and a Radio ID, the combination of both shown at 723, thus identifying each of the two devices shown as tethered in FIG. 7—to (3) the authentication server (UCACC), which (i) first determines if an active "portable satellite radio subscription" is associated with that Mobile Device ID (2*a*), and then (ii) looks up the Radio Device ID of the Receiver Unit (1) so that it can decrypt or authenticate the message and know that the Mobile Device is communicating with the Radio Module (Receiver Unit) in real time. As described above, the authentication server can then generate Authorization Messages (4) in response to each valid authenticated Authorization Request (2*b*). An example format of the Authorization Response (4) is shown at the bottom right of FIG. 7. It contains a Secure Authorization With Expiration 733, and may be encrypted with Radio Key and other information, such as, for example, time and sequence number so as to make locally stored repeats useless. It can also, as shown, contain a Next Request Time 731 (in the clear), which can be set by the authorization server or the Unified Conditional Access Control Center to be prior to the (secret) Expiration Time in the Authorization Response message. Thus, in a preferred implementation, the expiration date and time in the Authorization Message (4), can be adjusted to be longer than the scheduled frequency of Authorization Requests (2*b*), so as to allow for lower wireless charges and the possibility of Internet delays or packet loss. For example, such expiration times can be 1 minute in the future, and the Authorization Request could be sent every 20 or 30 seconds. Various similar combinations of these values can be implemented, as described above.

In an alternate exemplary implementation, the next request time could be hard coded to a specific fixed offset from the expiration time, so that the next request is always sent, for example, N seconds before the authorization expires. Still alternatively, the expiration time could be a fixed offset M from the time that the authorization message was received by the device, such that each authorization message received would grant service for some fixed amount of time, such as, for example, 10 minutes, 15 minutes, 20 minutes, etc. In the above example, N could be, for example, 60, 90 or 120 seconds, or any other convenient increment.

FIG. 8 provides additional details of the process shown in FIG. 7 and described above. As shown in FIG. 8, at 813, Steps 1 and 2 of FIG. 7 may happen during the tethering process (or substantially immediately after tethering is complete), and then may happen again periodically for the satellite radio device to remain authorized, as noted. Moreover, as shown at 823, Mobile Device ID may be a serial number, MEID or IMEI, ICCID, phone number or CDN, or some combination of all, or a defined subset of, these numbers. Finally, Radio Device Key 815 is a secret Key available to the Radio Device (and also, of course, known to the Conditional Access Control Center). FIG. 8 also shows exemplary fields in each of the Subscriber Database, and Radio Device Database.

Thus, as shown in FIG. 8, at 1 the Wireless Mobile Device 820 sends the Mobile Device ID (2*a*) to the Radio Device 810. The Radio Device 810 then sends the (Mobile Device ID)+Radio ID at 2 back to the Wireless Mobile Device 820, which then sends an Authorization Request at 3, to the Unified Conditional Access Control Center ("UCACC") 830. Upon receiving the Authorization Request, as noted, the UCACC 830 first determines if an active "portable satellite radio subscription" is associated with that Mobile Device ID (by referencing Subscriber Database 835), and then (ii) looks up the Radio Device ID of the Radio Device (in Radio Device Database 837) so that it can decrypt or authenticate the message and know that the Mobile Device is communicating with the Radio Device in real time. Once having verified this information, the Unified Conditional Access Control Center 830 generates and sends an Authorization Response, at 4, to the Wireless Mobile Device 820, which then sends an Authorization Credit at 5 to the Radio Device 810, as shown in FIG. 8.

Multiple Two-Way Devices Connected

Figure 9:
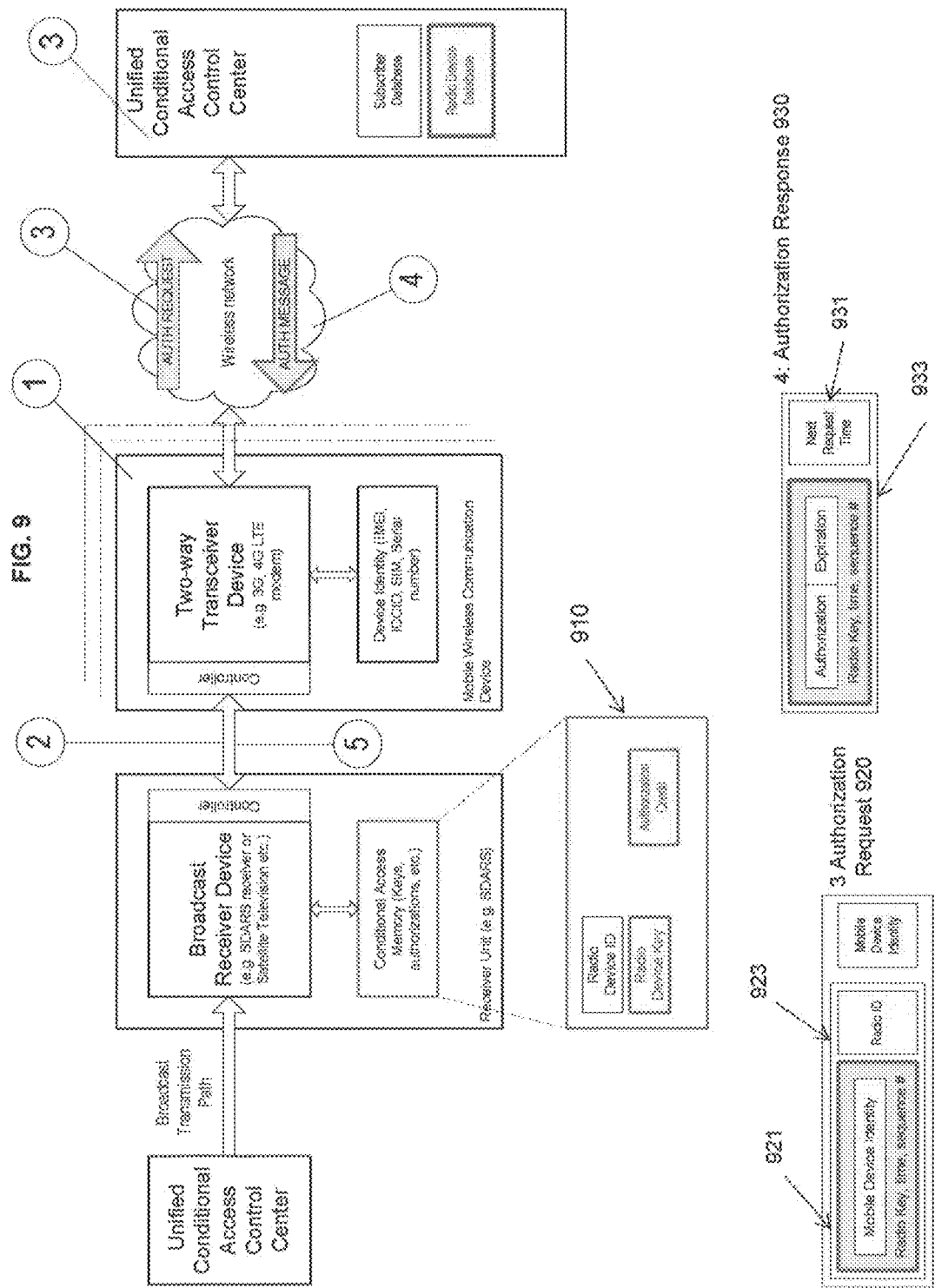
FIG. 9 illustrates multiple two-way remote transceiver devices temporarily connected to a Broadcast Receiver Device and accessing programming that it receives according to an exemplary embodiment of the present invention.

FIG. 9 illustrates connecting multiple Two-Way Remote Transceiver Devices (e.g., smartphones) to a Broadcast Receiver Device according to an exemplary embodiment of the present invention. Such a scenario may be very useful in a vehicle equipped with a broadcast receiver, such as, for example, an SDARS receiver, or other broadcast content receiver, where the Broadcast Receiver Device can actually decode multiple channels simultaneously, even though a user, such as the driver, may choose to only listen to one, or none, or may not even be authorized to play any. In exemplary embodiments of the present invention, other users can each access a different channel of their choice from channels in the broadcast multiplex, and can each play that channel through their two-way transceiver device, such as a smartphone, using ear buds or headphones. In other words, in this exemplary embodiment, various different users, each having their own different subscription to the SDARS or other service received in the vehicle, can "bootstrap" or leverage the vehicle's built in broadcast receiver hardware to play the broadcast service's content through their own two-way transceiver device.

With reference to FIG. 9, the following exemplary process may be implemented. At 1 a Two-way Transceiver Device, say for example a smartphone, requests access (e.g. "tune channel 7") from the Broadcast Receiver Device. At 2 the Broadcast Receiver Device requests authorization to serve the smartphone. In response, at 3, the smartphone (i.e., its owner or user), having a subscription to the broadcast service, requests an authorization code from the Unified Conditional Access Control Center, and at 4, the Unified Conditional Access Control Center sends an authorization code to the smartphone. Once received, at 5, the smartphone sends the authorization code to the Broadcast Receiver Device, and now duly authorized, the Broadcast Receiver Device provides access (e.g., tunes to channel 7 and transmits, for example, the signal over Wi-Fi) to the smartphone.

As shown at 910, the Conditional Access Memory of the Broadcast Receiver Device should preferably have at least some portion which is fixed or only programmable with great difficulty (such as One-Time Programmable memory) containing the identity of the Radio and at least one fixed key.

Similar to the scenario shown in FIG. 7, the Authorization Request 920 includes a Secured Mobile Device Identity 921

(with Radio Key, time and sequence number) and a Radio ID, the combination of both being shown at 923.

An example format of the Authorization Response 930 (sent at 4) is shown at the bottom right of FIG. 9. It contains a Secure Authorization With Expiration 933, and may be encrypted with Radio Key and other information, such as, for example, time and sequence number so as to make locally stored repeats useless. It can also, as shown, contain a Next Request Time 931 (in the clear), which can be set by the authorization server or the Unified Conditional Access Control Center to be prior to the (secret) Expiration Time in the Authorization Response message. Thus, in a preferred implementation, the expiration date and time in the Authorization Message (4), can be adjusted to be longer than the scheduled frequency of Authorization Requests (3), so as to allow for lower wireless charges and the possibility of Internet delays or packet loss. For example, such expiration times can be 1 minute in the future, and the Authorization Request could be sent every 20 or 30 seconds, or other combinations of these values, as described above.

In this way, the Broadcast Receiver Device can support multiple smartphones. Moreover, even if the Broadcast Receiver Device is not an authorized SDARS receiver on its own, such as, for example, the owner of the vehicle has not yet subscribed to the SDARS service that the Broadcast Receiver Device receives, the authorization code received from the smartphone will enable it to be authorized for the specified period of time AND only authorized for the specific Two-Way Transceiver Device (smartphone) that requested such access. In other words, if the SDARS device is not authorized, it can, for example, provide channel 7 over Wi-Fi to the smartphone, but it will NOT play any channels on its own (in the vehicle, through the vehicle infotainment system). Alternatively, even if not authorized, if an authorized smartphone is tethered to it, while the two are tethered, the Broadcast Receiver Device can also play any channels on its own, under a "derivative" authorized subscription feature attached to the smartphone (i.e., the smartphone owner may use an unauthorized head unit to play content through the vehicle's infotainment system as long as the two are tethered and as long as access is authorized, as described above). Various contractual combinations and permutations of these functionalities and derivative or temporary authorized content access scenarios are possible in various exemplary embodiments.

It is noted that one smartphone may request access on behalf of a number of additional smartphone listeners, or for an unauthorized broadcast receiver itself, as long as its account with the SDARS broadcasting service allows such multiple device access. If multiple smartphones request and gain access independently, they may each be independently served by the Broadcast Receiver Device, and then if one leaves, this has no effect on the others' ability to listen. As can well be appreciated, many variations are possible, all dependent upon the level of access granted by the SDARS service to each smartphone owner; all such possibilities being within the scope of the present invention.

Sending Decryption Keys Over a Broadcast Receiver

In exemplary embodiments of the present invention, a large number of encrypted, device specific authentication certificates, for various types of devices needing conditional access, may be stored in a broadcast communication receiver device associated with one or more such devices, and using a decryption key, then be transmitted over a broadcast communication path on a periodic basis (e.g. weekly, monthly or quarterly, etc.) to enable the broadcast receiver to unlock one or more certificates, or bundles of certificates, for use in various types of in-vehicle, as well as general two-way network communications. It is noted that the decryption key referred to above is a relatively small amount of data, and it is this decryption key entity that is transmitted over the broadcast path. Once received, the key can then be used to decrypt the (relatively large) certificate that is already stored in a given device.

For example, a given device that regularly updates its access to a network, such as, for example, a V2V device, in-vehicle communications device, or more generally, any other "guest" or temporary user of a large number of users network, may, for example, have three years of certificates stored in it at the time of "personalization" before being deployed to the field. These certificates may be used at some finite rate, say, for example, a rate of 20 per week and then expire over time. In order to be renewed, such a device must communicate with "infrastructure" to request additional certificates. However, at least some vehicles may operate in remote areas where the ability communicate with such infrastructure devices is rare or non-existent. Increasing the number of pre-stored certificates increases the potential number of certificates that must be revoked if one of the in-vehicle or other devices is "rogue" (e.g., transmitting false and/or misleading information with the intent of disrupting traffic) so that other vehicles, or other participants in the multi-user network, will no longer trust the device and all of its certificates. A better solution is to store additional certificates in a way that they can be efficiently released over time with messages broadcast over a satellite path.

Thus, for example, a satellite receiver may have ten years' worth of certificates (such as, for example, 20 certificates per week, for 52 weeks per year, for 10 years, or 10,400 total certificates). Each bundle of 20 certificates can, for example, have a validity period of one week, and each week the satellite transmission system could send messages to radios (or groups of radios) containing the key necessary to decrypt that week's worth of certificates for use, in the event that they were unable to replenish their certificates through the normal network infrastructure. Alternative implementations can, for example, bundle the certificates in groups with longer validity periods, such as, for example, 20 certificates with a one month validity period, and/or in various different size groups. In a further refinement of this approach, the key used to decrypt the certificates can be designed such that each decryption key could be used to decrypt the certificates in one group as well as evolving the decryption keys required for all previous certificate groups. In this way, transmitting a single decryption key to a single device could unlock a variable number of certificates for future use. Thus, for example, transmitting the "July 2020 group key" would unlock certificates for July 2020, June 2020, May 2020, and so forth, back to the current month.

Exemplary Implementations

The various illustrative systems, methods, logical features, blocks, modules, components, circuits, and algorithm steps described herein may be implemented, performed, or otherwise controlled by suitable hardware known or later developed in the art, or by software executed by a processor (also referred to as a "processing device" and also inclusive of any number of processors), or by both. A processor may perform or cause any of the processing, computational, method steps, or other system functionality relating to the processes/methodologies and systems disclosed herein, including analysis, manipulation, conversion or creation of data, or other operations on data. A processor may include a general purpose processor, a digital signal processor (DSP), an application specific integrated circuit (ASIC), a field programmable gate array (FPGA) or other programmable logic device, discrete gate or transistor logic, discrete hardware components, server, or any combination thereof. A processor may be a conventional processor, microprocessor, controller, microcontroller, or state machine. A processor can also refer to a chip, where that chip includes various components (e.g., a microprocessor and other components). The term "processor" may refer to one, two or more processors of the same or different types. It is noted that the terms "computer" or "computing device" or "user device" or the like may refer to devices that include a processor, or may refer to the processor itself. Software may reside in RAM memory, flash memory, ROM memory, EPROM memory, EEPROM memory, registers, hard disk, a removable disk, a CD-ROM, or any other form of storage medium. A "memory" may be coupled to a processor such that the processor can read information from and write information to the memory. The storage medium may be integral to the processor. Software may be stored on or encoded as one or more instructions or code on a computer-readable medium. Computer-readable media be any available storage media, including nonvolatile media (e.g., optical, magnetic, semiconductor) and carrier waves that transfer data and instructions through wireless, optical, or wired signaling media over a network using network transfer protocols. Aspects of systems and methods described herein may be implemented as functionality programmed into any of a variety of circuitry, including. Aspects may be embodied in processors having software-based circuit emulation, discrete logic, custom devices, neural logic, quantum devices, PLDs, FPGA, PAL, ASIC, MOSFET, CMOS, ECL, polymer technologies, mixed analog and digital, and hybrids thereof. Data, instructions, commands, information, signals, bits, symbols, and chips that may be referenced throughout the above description may be represented by voltages, currents, electromagnetic waves, magnetic fields or particles, optical fields or particles, or any combination thereof. Computing networks may be used to carry out aspects and may include hardware components (servers, monitors, I/O, network connection). Application programs may carry out aspects by receiving, converting, processing, storing, retrieving, transferring and/or exporting data, which may be stored in a hierarchical, network, relational, non-relational, object-oriented, or other data source. "Data" and "information" may be used interchangeably. The words "comprise," "comprising," "include," "including" and the like are to be construed in an inclusive sense (i.e., not limited to) as opposed to an exclusive sense (i.e., consisting only of). Words using the singular or plural number also include the plural or singular number respectively. The words "or" or "and" cover any of the items and all of the items in a list. "Some" and "any" and "at least one" refers to one or more. The term "device" may comprise one or more components (e.g., a processor, a memory, a screen). The terms "module," "block," "feature," or "component" may refer to hardware or software, or a combination of both hardware and software, that is configured to carry out or otherwise achieve the functionality associated with those modules, blocks, features or components. Similarly, features in system and apparatus figures that are illustrated as rectangles may refer to hardware or software. It is noted that lines linking two such features may be illustrative of data transfer between those features. Such transfer may occur directly between those features or through intermediate features even if not illustrated. Where no line connects two features, transfer of data between those features is contemplated unless otherwise stated. Accordingly, the lines are provide to illustrate certain aspects, but should not be interpreted as limiting.

Any suitable programming language can be used to implement the routines of particular exemplary embodiments including, but not limited to, the following: C, C++, Java, JavaScript, Python, Ruby, CoffeeScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time Particular embodiments may be implemented in a computer-readable storage device or non-transitory computer readable medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for transmitting conditional access information, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

The above-presented description and figures are intended by way of example only and are not intended to limit the present invention in any way except as set forth in the following claims. It is particularly noted that the persons skilled in the art can readily combine the various technical aspects of the various elements of the various exemplary embodiments that have been described above in numerous other ways, all of which are considered to be within the scope of the invention.

What is claimed:

1. A computer-implemented method for initializing or updating conditional access of a two-way device to a subscription service, comprising:
   receiving, by the two-way device and from a broadcast receiver, conditional access information contained in an encrypted broadcast transmission received by the broadcast receiver via a one-way communications path;
   processing, by the two-way device, the conditional access information; and
   sending, by the two-way device, to an access control device and via a two-way communications path, an acknowledgement message confirming a state change in the conditional access of the two-way device to the subscription service.

2. The computer-implemented method of claim 1, wherein at least one of:
   the broadcast receiver first processes the conditional access information before passing it;
   the two-way device and the broadcast receiver are integrated in a single device further including a controller that can coordinate and mediate their communications and route data between them;
   the broadcast receiver is a satellite radio receiver; or
   the two-way device is one of: a cellular phone that is tethered or docked to the broadcast receiver, or an embedded modem in a vehicle.

3. The computer-implemented method of claim 1, further comprising:
   sending, by the two-way device and to the broadcast receiver, a request for accessing at least one broadcast media channel being received by the broadcast receiver;
   receiving, by the two-way device and from the broadcast receiver, a request for an authorization code;
   sending, by the two-way device and to the access control device, a request for an authorization code based on subscription to the at least one broadcast media channel;
   receiving, by the two-way device and from the access control device, the requested authorization code;
   sending, by the two-way device and to the broadcast receiver, the authorization code; and
   receiving, by the two-way device and from the broadcast receiver, transmission including the at least one broadcast media channel.

4. A computer-implemented method, comprising:
   receiving, by at least one processor and from a broadcast receiver, a conditional access message, wherein the conditional access message is received by the broadcast receiver via a one-way communications path;
   generating, by the at least one processor, acknowledgement data based at least in part on the received message, wherein the acknowledgement data identifies the received message using an index or reference; and
   sending, by the at least one processor and to an access control device, the generated acknowledgement data using a two-way communications path.

5. The computer-implemented method of claim 4, wherein at least one of:
   the acknowledgement data is encrypted or signed by the at least one processor in a way that authenticates that the messages were received by a device targeted by the access control device;
   the acknowledgement data includes a hash or permutation of a final conditional access state of the at least one processor;
   the acknowledgement data includes a hash or permutation of a final conditional access state of the at least one processor and the hash includes a cumulative result of all messages received along with other events such as listening time and user actions;
   receipt of the acknowledgement data operates as a trigger to stop repeated transmissions of conditional access messages addressed to the broadcast receiver;
   the conditional access messages enable the broadcast receiver to receive encrypted communications over a broadcast signal path;
   the conditional access messages remove authorization to receive encrypted communications over a broadcast path, causing the broadcast receiver to at least one of: be unable to decrypt those encrypted transmissions, and be unable to extract the protected transmissions;
   the broadcast receiver is a satellite radio receiver; or
   the two-way device is one of: a cellular phone that is tethered or docked to the Broadcast Receiver Device, or an embedded modem in a vehicle.

6. The computer-implemented method of claim 4, wherein the at least one processor and the broadcast receiver are integrated in a single device further including a controller that can coordinate and mediate their communications and route data between them.

7. A computer-implemented method for updating a conditional access state of a broadcast receiver, the method comprising:
   receiving, by the broadcast receiver and from a two-way transceiver operatively connected to the broadcast receiver, a conditional access message sent by an access control device to the two-way transceiver via a two-way communications path;
   updating, by the broadcast receiver, a conditional access state of the broadcast receiver based at least in part on the conditional access message; and
   receiving, by the broadcast receiver and via a one-way communications path, broadcast media channels based on confirming that the conditional access state enables reception of the broadcast media channels.

8. The computer-implemented method of claim 7, wherein the broadcast media channels are encrypted communications sent over a broadcast signal path, the method further comprising:
   receiving another conditional access message that removes authorization to receive encrypted communications over the broadcast signal path, rendering the broadcast receiver unable to decrypt the encrypted communications, or otherwise block the extraction of the encrypted communications.

9. The computer-implemented method of claim 7, wherein at least one of:
   the broadcast receiver is a satellite radio receiver;
   the two-way transceiver is a cellular phone that is tethered or docked to the broadcast receiver device; or
   the two-way transceiver is an embedded modem in a vehicle.

10. The computer-implemented method of claim 7, further comprising:
    sending, by the broadcast receiver and to the two-way transceiver, an acknowledgement message that is addressed to the access control device, wherein the acknowledgment message is configured to be delivered to the access control device by the two-way transceiver via the two-way communications path, and wherein at least one of:

the acknowledgement message identifies conditional access messages that were received using an index or reference;

the acknowledgement message is encrypted or signed by the broadcast receiver in a way that authenticates that the conditional access message was received by the broadcast receiver;

the acknowledgement message includes a hash or permutation of a final conditional access state of the broadcast receiver; or the acknowledgement message includes a hash or permutation of a final conditional access state of the broadcast receiver and the hash includes a cumulative result of all conditional access messages received along with other events such as listening time and user actions.

11. The computer-implemented method of claim 7, further comprising receiving additional messages to update the conditional access state of the broadcast receiver over a broadcast communications path.

12. The computer-implemented method of claim 11, wherein at least one of:

all or substantially all of the additional messages are received over the broadcast communications path; and at least some portion of the additional messages are received over the two-way communications path, and the method further comprises:

combining, by at least one processor, the additional messages from the two-way communications path and the broadcast path to achieve a desired change in the conditional access state.

13. The computer-implemented method of claim 11, wherein the receiving the additional messages is based on at least one of:

sending, by the broadcast receiver and to the access control device, a confirmation indicative of the broadcast receiver being activated for reception of communication from the access control device; and receiving, by the broadcast receiver, the additional messages over the broadcast path after a delay that is based on the access control device receiving the confirmation; or a fixed time delay after the sending the acknowledgement message.

14. The computer-implemented method of claim 11, further comprising:

generating, by the broadcast receiver, acknowledgement data, wherein at least one of:

the acknowledgement data identifies the received message using an index or reference;

the acknowledgement data is encrypted or signed by the broadcast receiver in a way that authenticates that the message was received by the broadcast receiver;

the acknowledgement data includes a hash or permutation of a final conditional access state of the broadcast receiver; or the acknowledgement data includes a hash or permutation of a final conditional access state of the broadcast receiver, and the hash includes a cumulative result of all messages received along with other events such as listening time and user actions.

15. The computer-implemented method of claim 11, wherein the received conditional access message includes a future wake up time, or a future wake up period, and the additional messages are sent after the future wake up time, or during the future wake up period.

16. A computer-implemented method, comprising:

receiving, at a two-way communication device and from a broadcast receiver, a conditional access message, wherein the broadcast receiver is operatively connected to the two-way communications device through a controller that coordinates communications between the two-way communications device and the broadcast receiver, and wherein the conditional access information is received by the broadcast receiver via a one-way communications path and from an access control device;

activating the two-way communications device from an inactive state to an active state based at least in part on the received conditional access message;

receiving, by the two-way communication device in the active state, a configuration update;

applying, by the two-way communication device, the configuration update; and sending, by the two-way communication device and to the access control device, an acknowledgement message indicative of receipt of the conditional access message.

17. The computer-implemented method of claim 16, wherein the two-way communication device and the broadcast receiver are wirelessly tethered or linked together, and wherein the acknowledgment message is configured to prevent additional conditional access messages being sent to the two-way device.

18. The computer-implemented method of claim 16, wherein the two-way communication device and the broadcast receiver are at least one of:

linked or tethered through a wired connection;

linked or tethered through a docking connector or cable running between the two-way communication device and the broadcast receiver, either directly or through an intermediary processor; or linked or tethered through a docking connector or cable running between the two-way device and the broadcast receiver, through a vehicle-embedded controller or processor.

19. The computer-implemented method of claim 16, wherein the received conditional access message causes the two-way communication device to initiate communication with the conditional access device.

20. The computer-implemented method of claim 19, wherein:

the acknowledgement message is sent on the same network as the conditional access message; and/or the acknowledgement message is sent on a different network from a network over which the conditional access message was sent after applying the configuration file changes.

* * * * *